United States Patent [19]

Ditlya

[11] Patent Number: 5,229,911
[45] Date of Patent: Jul. 20, 1993

[54] VARIABLE TRIMMER CAPACITOR
[75] Inventor: David Ditlya, Fair Lawn, N.J.
[73] Assignee: Voltronics Corporation, Denville, N.J.
[21] Appl. No.: 893,375
[22] Filed: Jun. 4, 1992
[51] Int. Cl.[5] .......................... H01G 5/00; H01G 5/01
[52] U.S. Cl. ...................................... 361/277; 361/278
[58] Field of Search ................... 361/277–279, 361/287, 288, 290–295; 338/160–164; 29/25.42

[56] References Cited

U.S. PATENT DOCUMENTS

| | | | |
|---|---|---|---|
| 3,483,450 | 12/1969 | Blickstein et al. | 361/296 |
| 3,675,093 | 7/1972 | Russo et al. | 361/296 |
| 3,679,940 | 7/1972 | Newman et al. | 361/400 |
| 3,757,266 | 9/1973 | Newman et al. | 338/158 |
| 4,415,949 | 11/1983 | Blickstein | 361/296 |
| 4,575,779 | 3/1986 | Mittler et al. | 361/296 |
| 4,764,843 | 8/1988 | Mittler | 361/294 |
| 4,876,627 | 10/1989 | Mittler et al. | 361/293 |
| 4,953,057 | 8/1990 | Davidian | 361/279 |

Primary Examiner—Bruce A. Reynolds
Assistant Examiner—Michael D. Switzer
Attorney, Agent, or Firm—Lerner, David, Littenberg, Krumholz & Mentlik

[57] ABSTRACT

A variable electronic component in the nature of a trimmer capacitor has greatly increased voltage rating and capacitance range, while eliminating possible failure modes. An annular opening formed in a stationary electrode is surrounded by plastic dielectric material so as to receive in interference fit a circular sleeve of an opposing impedance varying electrode. By filling the air gap with plastic dielectric material, no air contributes to the effective dielectric, while at the same time, preventing shorting as a result of loose metallic particles which might be present.

24 Claims, 3 Drawing Sheets

VARIABLE TRIMMER CAPACITOR

BACKGROUND OF THE INVENTION

The present invention relates in general to a variable electronic component, and more particularly, to a variable trimmer capacitor adapted to provide a high resolution operative range of impedance characteristics, i.e., capacitance (pF), at greatly increased voltage ratings while eliminating possible failure modes.

In the advancing technologies of computers, testing equipment, appliances and other fields, various types of hybrid electronic circuits, integrated electronic circuits, micro strip amplifiers, micro electronic systems and other electronic devices are being developed and which are being made on increasingly smaller scale and size then has been known heretofore. In accomplishing this end, these devices are generally mounted on small flat insulating bases known as substrates. These various devices incorporate or have formed therein or co-act with various types of electronic components such as inductors, capacitors, resistors, potentiometers, etc., which in turn must be as small as possible to meet the demands of the reduced scale or size of these devices.

The known miniature devices have reached their functional limit even with the best precision manufacturing techniques because certain elements of these devices cannot be reduced further at reasonable cost for commercially acceptable regularly usable devices. U.S. Pat. Nos. 3,679,940, 3,757,266, 4,575,779, 4,764,843 and 4,876,627, which patents are assigned to the same assignee of the within invention, each disclose variable electronic components, such as trimmer capacitors and resistors, which are particularly adapted to meet and overcome the problems of these known devices by eliminating the area and mass of conventional mounting frames, tuning mechanisms and other elements heretofore used, and instead integrate the elements of these variable electronic components directly into the circuit. These components are primarily designed as low-profile structures exceedingly small in size, simple in construction, easily adjustable, reliable in operation, easily replaceable and reproducible in quantity without sacrificing uniformity or performance.

In Blickstein, et al., U.S. Pat. No. 3,483,450, assigned to the same assignee of the within invention, there is known a concentric ring air trimmer capacitor useful in high frequency circuits because of its high Q, its low self inductance and its self-resonant frequency which is well above one GHz. The capacitor of Blickstein, et al., shown in FIG. 1 includes a cylindrical housing 100 of insulating material, such as ceramic, which is metallized at its ends. Positioned within the housing 100 is a stator capacitor plate or stationary electrode 102 which is formed of concentric cylindrical sleeves 104 extending from an end plate 106. The entire unit may be precision die-cast or machined of metal, as for example, zinc. The stationary electrode 102 through the end plate 106 is in electrical contact with the metallized ends of the housing 100. The center of the stationary electrode 102 is in the form of a slide post 118 on which is positioned a plastic guide bushing 110. A metal bushing 112 which may also be precision die-cast or machined is secured to the other end of the housing 100. The bushing 112 forms an extension of the housing 100. The interior of the bushing 112 is provided with longitudinally extending guide slots (not shown). All but two opposed of these guide slots do not extend entirely through the bushing and are provided with blind end shoulders.

An adjustable impedance varying electrode 114 is provided for sliding actuation within the bushing 112. The impedance varying electrode 114 is in the form of a number of concentric cylindrical sleeves 116 Which can nest concentrically within the sleeves 104 forming the stationary electrode 102 with an air gap 115 therebetween to vary the impedance characteristics of the capacitor. The impedance varying electrode 114 may also be precision die-cast or machined of metal, axially drilled and tapped with threads at 118. The end of the impedance varying electrode 114 is furthermore provided with guide extensions or lands (not shown), which engage in the guide slots of the bushing 112 to allow sliding of the impedance varying electrode without rotation. A spring washer 120 is provided with spring contact arms 122 extend in the guide slots which extend entirely through the bushing 112. The end of the bushing 112 is provided with an annular cut-out which forms shoulders between the slots. Movement of the spring washer 120 toward the stationary electrode 102 is prevented by the spring washer being seated against these shoulders. Spring washer 120 is preferably of beryllium copper and the contact arms 122 are preferably bent as shown so as to ensure sliding contact with the impedance varying electrode 114 and also to be maintained in electrical contact with the inner wall of the bushing 112.

A drive screw 124 extends coaxially into the bushing 112. The end of the drive screw 124 is provided with an enlarged head or flange 126 which engages the washer 120 in order to prevent axial movement of the drive screw toward the housing end. The outer end of the flange 126 engages a washer 128 which is held in place by the turned in edge or lip of the end of the bushing 112. A sealing ring 130 surrounds the flange 126 in order to provide sealing between the flange and the bushing 112. The drive screw 124 is provided with a conventional slotted head for rotation with a screw drive. The drive screw 124 is thus rotatably captured in the bushing 112 and with the sealing ring 130 forms a rotating seal, sealing the end of the bushing 112 and the entire interior of the unit.

In the Blickstein, et al. capacitor, the capacitance is determined by the dimensions of the air gap 115 between the stationary and impedance varying electrodes 102, 114. Because this air gap is on the order of 0.003 inches and must be maintained uniformly throughout the travel of the impedance varying electrode, the tolerance and a manufacturing process must be tightly controlled. As these tolerances have a finite limit, it is not possible to extend the capacitance range beyond about 16 pF as the resulting dimension of the air gap 115 would be inadequate to prevent shorting between the stationary and impedance varying electrode 102, 114. This problem is specifically severe in high RF voltage applications where arcing in the air space may be more prevalent.

In an apparent effort to address these problems, Blickstein, et al. has contemplated coating the stationary and impedance varying electrodes 102, 114 with thin layer of plastic dielectric material, such as Paralene. However, this modification still requires the presence of the air gap 115 to constitute the dielectric medium for the capacitor.

In Davidian, U.S. Pat. No. 4,953,057, there is disclosed a capacitor constructed from a pair of opposing spiral coils made from a continuous flexible thin film of dielectric plastic material such as Mylar ®, polycarbonate or polypropylene which has been coated on one side with a thin layer of conductive material such as aluminum. The Davidian capacitor, based upon thin film technology, suffers from a number of notable drawbacks. For example, the capacitor is inherently unstable with respect to vibration and shock, as well as being inoperative at higher frequencies. In addition, as it is a requirement that the spiral coils be at least always partially nested, this results in a higher minimum capacitance which may be undesirable in certain applications. Still further, the use of continuous spirals having an extensive number of turns renders the capacitor complicated to manufacture and assemble.

Accordingly, it can be appreciated that there is an unsolved need for a variable electronic component, such as a variable trimmer capacitor, which can provide a desired high resolution operative range of impedance characteristics quickly, simply and inexpensively at substantially increased voltage ranges.

SUMMARY OF THE INVENTION

It is broadly an object of the present invention to provide a variable electronic component which overcomes or avoids one or more of the foregoing disadvantages resulting from the above-mentioned known variable electronic components, and which fulfills the specific requirements of such a variable electronic component for use in subminiature electronic circuits such as those disposed on a supporting substrate.

Another object of the present invention is to provide a variable electronic component that maintains precision capacitance during shock and vibration of electronic equipment into which it is installed.

Another object of the present invention is to provide a variable electronic component that has a high capacitance range and high voltage rating.

Another object of the present invention is to provide a variable electronic component that has a relatively long life with no dynamic tuning noise.

Another object of the present invention is to provide a variable electronic component particularly adapted for use in high frequency subminiature electronic systems and devices.

Another object of the present invention is to provide a variable electronic component which avoids arcing in the air gap to prevent burn through at, specifically, high RF voltage applications.

In accordance with one embodiment of the present invention, there is disclosed a variable electronic component constructed of a housing, a first electrode including at least one annular opening surrounded by dielectric material within one end of the housing, an impedance varying electrode within another end of the housing nestable within the annular opening in interference relationship with the dielectric material, and moving means for axially moving at least one of the electrodes within the housing to vary the extent of nesting of the impedance varying electrode within the annular opening in interference relationship with the dielectric material to provide a desired range of impedance characteristics to the component.

In accordance with another embodiment of the present invention, there is disclosed a variable electronic component constructed of a housing having a longitudinal axis, a stationary electrode within one end of the housing constructed of electrically conductive material, the stationary electrode including at least one annular opening surrounded by plastic dielectric material, an impedance varying electrode constructed of electrically conductive material within another end of the housing, the impedance varying electrode movable axially between the another end and a location nested within the annular opening in interference relationship with the dielectric material, and moving means for axially moving the impedance varying electrode without rotation thereof within the housing along the axis to vary the extend of nesting of the impedance varying electrode within the annular opening in interference relationship with the dielectric material to provide a desired range of impedance characteristics to the component.

In accordance with another embodiment of the present invention, there is disclosed a variable electronic component constructed of a housing having a longitudinal axis, a stationary electrode constructed of rigid self-supporting electrically conductive material including at least one annular opening formed by concentrically opposed surfaces each covered with plastic dielectric material within one end of the housing, an impedance varying electrode constructed of rigid self-supporting electrically conductive material within another end of the housing, the impedance varying electrode movable axially between the another end and a location nested within the annular opening in interference relationship with the dielectric material, the impedance varying electrode including a cylindrical sleeve having a radial inner and outer surface, the sleeve receivable within the annular opening with the inner and outer surfaces in interference relationship with the dielectric material, the stationary electrode including a plurality of surfaces exposed to the impedance varying electrode, each of the surfaces isolated from contact with the impedance varying electrode by the plastic dielectric material, and moving means for axially moving the impedance varying electrode without rotation thereof within the housing along the axis to vary the extend of nesting of the impedance varying electrode within the annular opening in interference relationship with the dielectric material to provide a desired range of impedance characteristics to the component.

BRIEF DESCRIPTION OF THE DRAWINGS

The above description, as well as further objects, features and advantages of the present invention will be more fully understood with reference to the following detailed description of variable trimmer capacitor, when taken in conjunction with the accompanying drawings, wherein.

DETAILED DESCRIPTION OF THE PREFERRED EMBODIMENT

Figure 1:
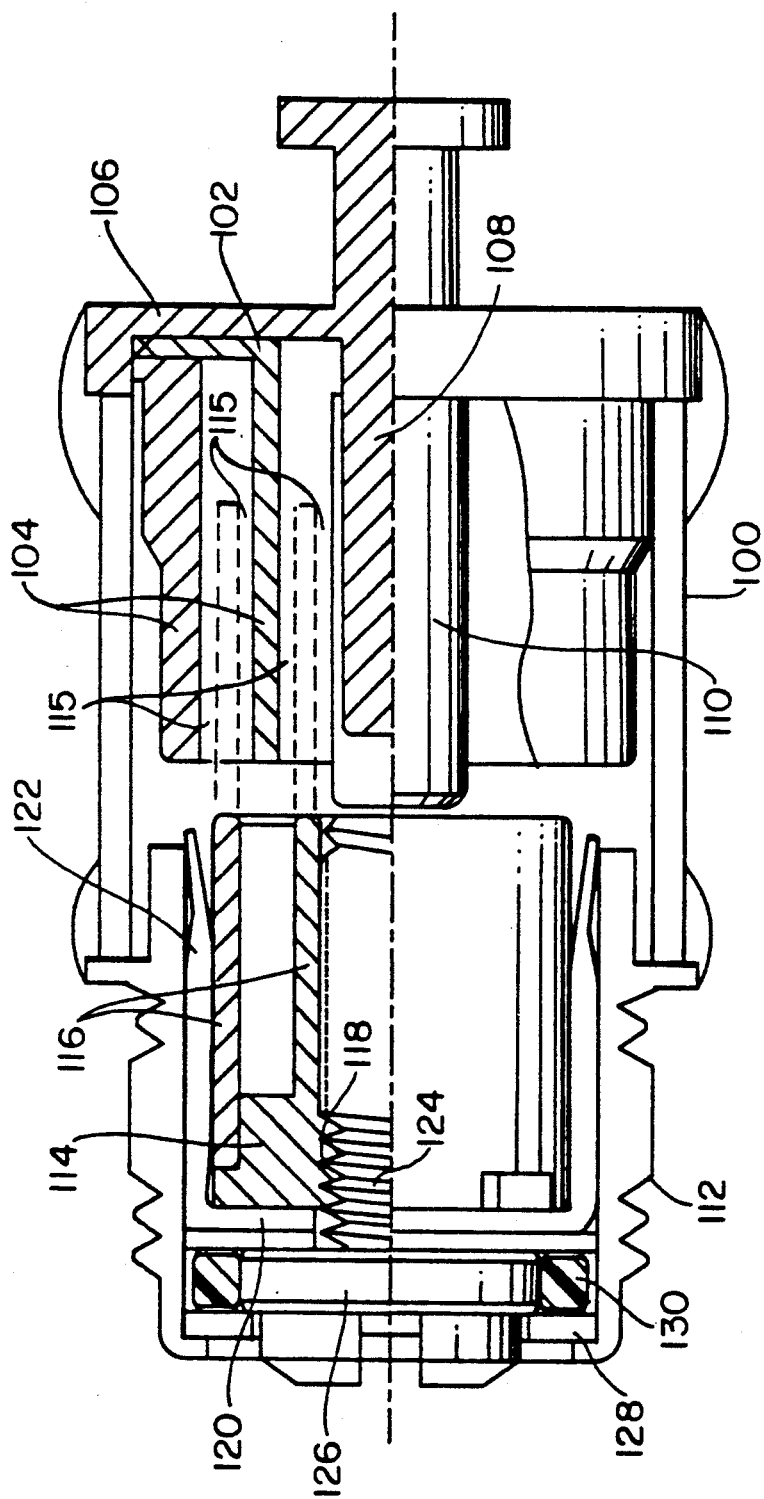
FIG. 1 is a side elevational view, in partial cross-section, of a variable trimmer capacitor constructed in accordance with the prior art.
Figure 2:
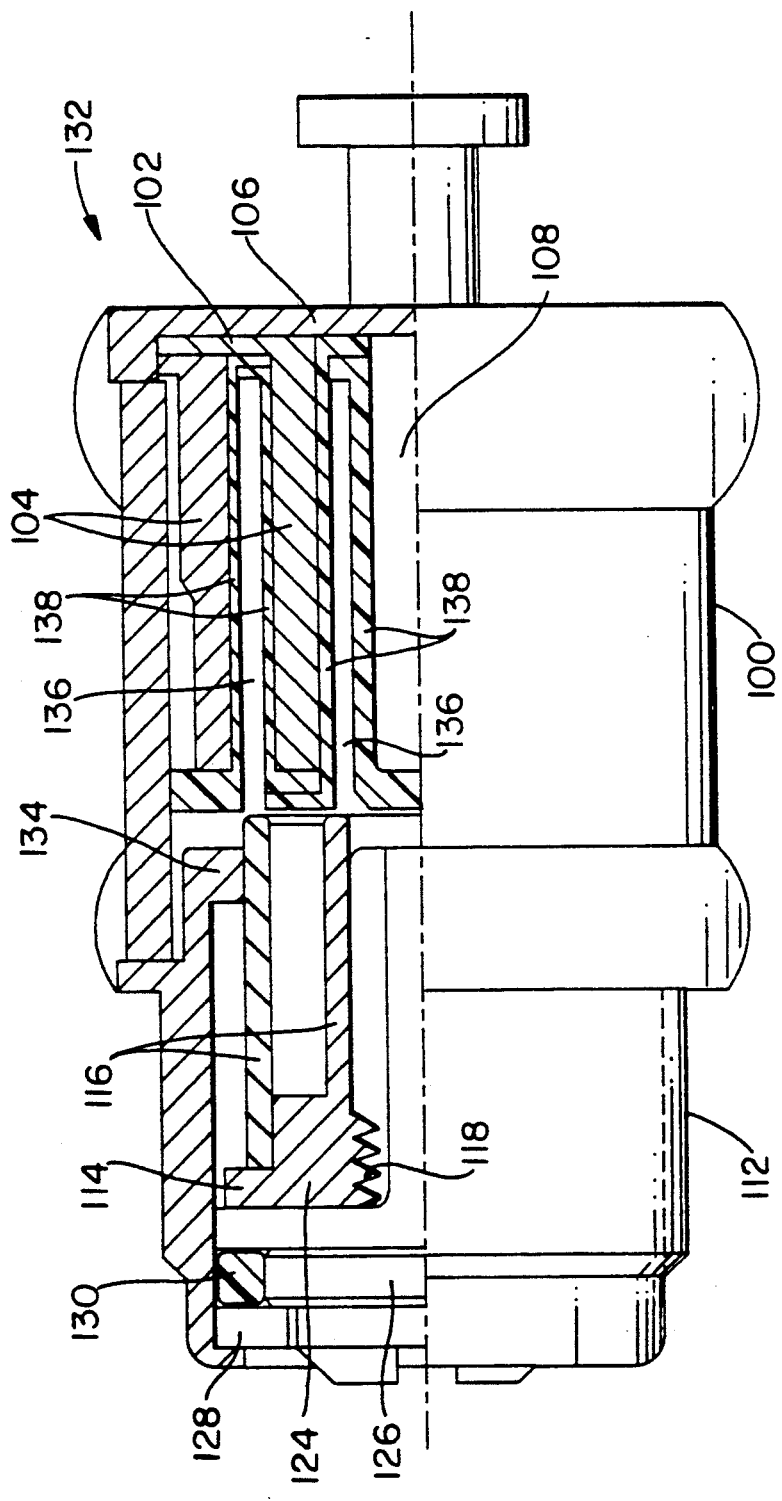
FIG. 2 is a side elevational view, in partial cross-section, of a variable trimmer capacitor constructed in accordance with one embodiment of the present invention.

Referring once again to the drawings, wherein like reference numerals represent like elements, there is shown in FIG. 2 a variable electronic component generally designated by reference numeral 132 in the nature of a trimmer capacitor. The variable electronic component 132 is designed for a variety of applications such as mobile radios, aerospace communication, crystal oscillators and filters, radar, cable TV, and innumerable other commercial and military programs. The design improvement of the variable electronic component 132 of the present invention over the known air-dielectric trimmer capacitor (see FIG. 1) prevents ionization within the capacitor air gap 115, especially at high altitudes experienced by avionics hardware and high voltages common to high powered amplifiers in communications, electronic-warfare, and medical diagnostic systems.

Referring to FIG. 2, the variable electronic component 132 is initially constructed in accordance the variable electronic component disclosed in FIG. 1. That is, the variable electronic component 132 is constructed generally to include stationary electrode 102 having concentrically arranged spaced apart cylindrical sleeves 104 constructed of electrically conductive material. Opposing the stationary electrodes 102 is an impedance varying electrode 114 also constructed of a pair of spaced apart concentrically arranged cylindrical sleeves 116 of electrically conductive material. The impedance varying electrode 114 is adapted for sliding movement, without rotation, by means of drive screw 124 so as to be nested in varying degrees within the stationary electrode 102 to vary the impedance characteristics. In one modification, the arms 122 of the spring washer 120 have been replaced by a projection 134 extending inwardly from the bushing 112 which slidingly engages the outermost sleeve 116 to maintain electrical continuity therewith.

Pursuant to the present invention, the annular openings 136 formed by the cylindrical sleeves 104 of the stationary electrode 102 are surrounded by plastic dielectric material 138. The dielectric material 138 as a plurality of pieces covers all those surfaces of the stationary electrode 102 exposed to the opposing impedance varying electrode 114, specifically, the cylindrical sleeves 116. The plastic dielectric material 138 is preferable Teflon®, as well as polycarbonates and ceramic material covered by a plastic dielectric material of the aforementioned type.

The thickness of the plastic dielectric material 138 is chosen to create an interference fit with the inner and outer radial surfaces of the sleeves 116 of the impedance varying electrode 114. For example, in accordance with one embodiment the plastic dielectric material 138 has a thickness in the order of 0.005 inches. That is, the plastic dielectric material 138 completely fills up any air gap between the opposing surfaces of the cylindrical sleeves 104, 116 of the respective stationary electrode 102 and impedance varying electrode 114. As such, the capacitance is not determined by the dimensions of an air gap 115 as known from the Blickstein, et al. capacitor, but rather based upon the dimensions and dielectric capacitance of the plastic dielectric material 138.

Figure 3:
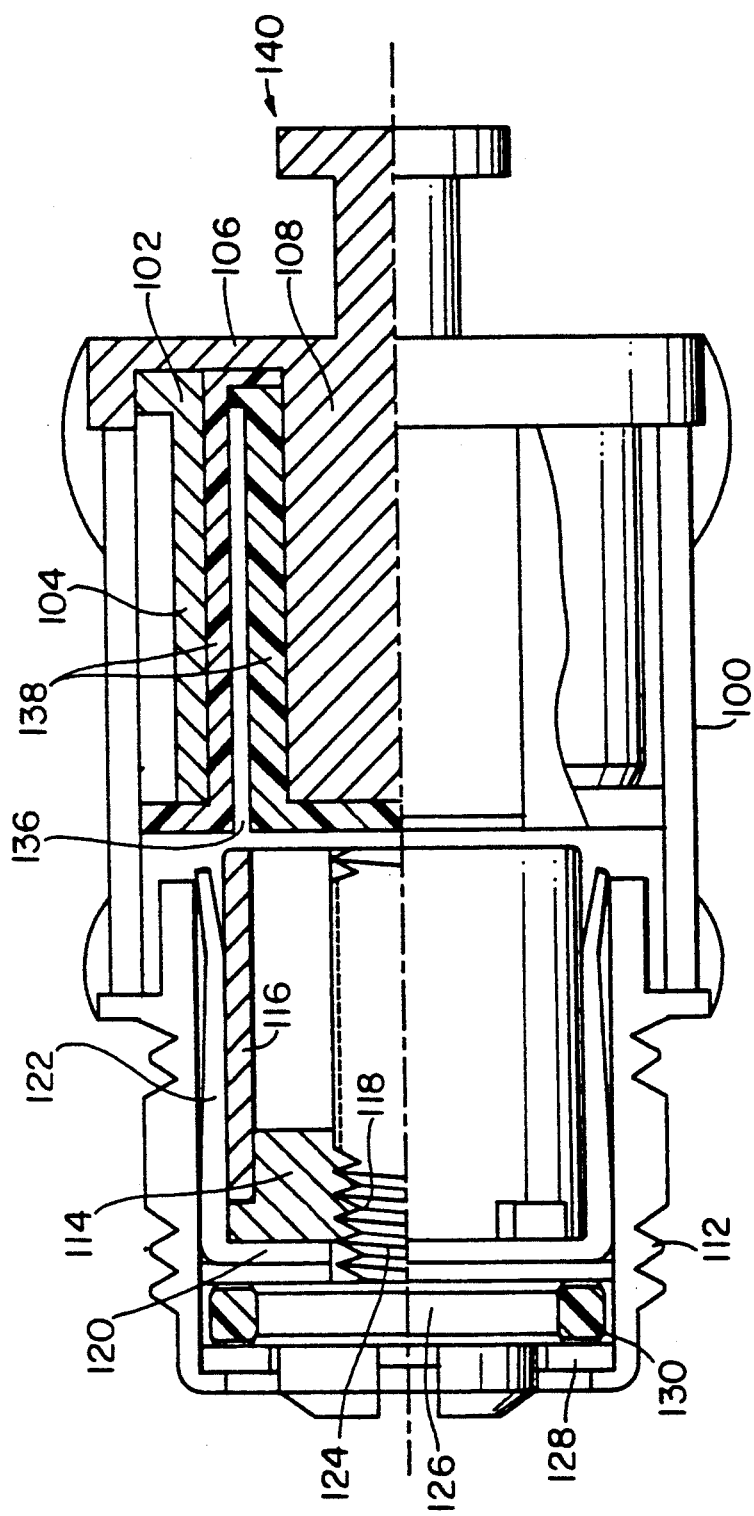
FIG. 3 is a side elevational view, in partial cross-section, of a variable trimmer capacitor constructed in accordance with another embodiment of the present invention.

Referring to FIG. 3, there is shown a variable electronic component 140 constructed in accordance with another embodiment of the present invention. In the embodiment disclosed, the stationary electrode 102 is provided with a single cylindrical sleeve 104 and the impedance varying electrode 114 is also provided with a single concentric sleeve 116. The stationary electrode 102 is formed with a single annular opening 136 which is surrounded with plastic dielectric material 138 in a manner as previously described with respect to FIG. 2. This construction of the impedance varying electrode 114 having a single cylindrical sleeve 116 results in a lower capacitance than the variable electronic component 132 disclosed in FIG. 2. It is therefore to be understood that any number of cylindrical sleeves 104, 116 may be used depending upon the capacitance desired balanced against the increased size of the capacitor.

By way of one example, a variable electronic component 140 having a diameter of 0.23 inches will tune from below 1 to over 9 pF. The variable electronic component 140 will withstand 2000 volts D.C. which is four to eight times greater than the variable electronic component disclosed in FIG. 1. The Q for the variable electronic component 140 is over 3000 at 100 MHz and the temperature coefficient is $-60$ to 30 ppm/°C. For example, the plastic dielectric material 138 has a thickness in the order of 0.005 inches.

As a result of the foregoing construction of the variable electronic component 132, 140 pursuant to the present invention, there is a substantial reliability improvement by virtue of the elimination of one possible failure mode after installation while substantially increasing the voltage rating and capacitance range. This failure mode is the possible shorting across the concentric sleeves 104, 114 by loose metallic particles the annular openings 136.

Although the invention herein has been described with references to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A variable electronic component comprising a housing, a first electrode including at least one annular opening surrounded by dielectric material within one end of said housing, an impedance varying electrode constructed of electrically conductive material within another end of said housing nestable within said annular opening in interference relationship with said dielectric material, and moving means for axially moving at least one of said electrodes within said housing to vary the extent of nesting of said impedance varying electrode within said annular opening, whereby said electrically conductive material of said impedance varying electrode is in interference relationship with said dielectric material by said dielectric material substantially filling up the air gap therebetween to provide a desired range of impedance characteristics to said component.

2. The variable electronic component of claim 1, wherein said first electrode includes at least two concentrically arranged annular openings each surrounded by dielectric material.

3. The variable electronic component of claim 2, wherein said impedance varying electrode includes at least two concentrically arranged cylindrical sleeves each having radial inner and outer surfaces, said sleeves respectively receivable within said annular openings with said inner and outer surfaces each in interference relationship with said dielectric material.

4. The variable electronic component of claim 1, wherein said impedance varying electrode includes a cylindrical sleeve having a radial inner and outer surface, said sleeve receivable within said annular opening with said inner and outer surfaces in interference relationship with said dielectric material.

5. The variable electronic component of claim 1, wherein said moving means moves said impedance varying electrode axially within said housing without rotation thereof.

6. The variable electronic component of claim wherein said dielectric material comprises plastic material or plastic coated ceramic material.

7. The variable electronic component of claim 6, wherein said plastic material is selected from the group consisting of polycarbonates and polytetrafluoro-ethylene.

8. The variable electronic component of claim 1, wherein said first electrode and said impedance varying electrode are constructed of electrically conductive material.

9. The variable electronic component of claim 1, wherein said first electrode includes a plurality of surfaces exposed to said impedance varying electrode, each of said surfaces isolated from contact with said impedance varying electrode by dielectric material.

10. A variable electronic component comprising a housing having a longitudinal axis, a stationary electrode within one end of said housing constructed of electrically conductive material, said stationary electrode including at least one annular opening surrounded by plastic dielectric material, an impedance varying electrode constructed of electrically conductive material within another end of said housing, said impedance varying electrode movable axially between said another end and a location nested within said annular opening in interference relationship with said dielectric material, and moving means for axially moving said impedance varying electrode without rotation thereof within said housing along said axis to vary the extend of nesting of said impedance varying electrode within said annular opening, whereby said electrically conductive material of said impedance varying electrode is in interference relationship with said dielectric material by said dielectric material substantially filling up the air gap therebetween to provide a desired range of impedance characteristics to said component.

11. The variable electronic component of claim 10, wherein said stationary electrode includes at least two concentrically arranged annular openings each surrounded by plastic dielectric material.

12. The variable electronic component of claim 11, wherein said impedance varying includes at least two concentrically arranged cylindrical sleeves each having radially inner and outer surfaces, said sleeves respectively receivable within said annular openings with said inner and outer surfaces each in interference relationship with said dielectric material.

13. The variable electronic component of claim 10, wherein said stationary electrode includes a plurality of surfaces exposed to said impedance varying electrode, each of said surfaces isolated from contact with said impedance varying electrode by dielectric material.

14. The variable electronic component of claim 10, wherein said plastic dielectric material is selected from the group consisting of polycarbonates and polytetrafluoroethylene.

15. The variable electronic component of claim 10, wherein said plastic dielectric material comprises plastic coated ceramic material.

16. The variable electronic component of claim 10, wherein said stationary electrode and said impedance varying electrode are each constructed of at least one cylindrical sleeve of rigid, self-supporting electrically conductive material.

17. A variable electronic component comprising a housing having a longitudinal axis, a stationary electrode constructed of rigid self-supporting electrically conductive material including at least one annular opening formed by concentrically opposed surfaces each covered with plastic dielectric material within one end of said housing, an impedance varying electrode constructed of rigid selfsupporting electrically conductive material within another end of said housing, said impedance varying electrode movable axially between said another end and a location nested within said annular opening in interference relationship with said dielectric material, said impedance varying electrode including a cylindrical sleeve having a radial inner and outer surface, said sleeve receivable within said annular opening with said inner and outer surfaces in interference relationship with said dielectric material, said stationary electrode including a plurality of surfaces exposed to said impedance varying electrode, each of said surfaces isolated from contact with said impedance varying electrode by said plastic dielectric material, and moving means for axially moving said impedance varying electrode without rotation thereof within said housing along said axis to vary the extend of nesting of said impedance varying electrode within said annular opening, whereby said electrically conductive material of said impedance varying electrode is in interference relationship with said dielectric material by said dielectric material substantially filling up the air gap therebetween to provide a desired range of impedance characteristics to said component.

18. The variable electronic component of claim 17, wherein said stationary electrode includes at least two concentrically arranged annular openings each surrounded by dielectric material.

19. The variable electronic component of claim 18, wherein said impedance varying member includes at least two concentrically arranged cylindrical sleeves each having radially inner and outer surfaces, said sleeves respectively receivable within said annular openings with said inner and outer surfaces each in interference relationship with said dielectric material.

20. The variable electronic component of claim 17, wherein said plastic dielectric material is selected from the group consisting of polycarbonates and polytetrafluoroethylene.

21. The variable electronic component of claim 17, wherein said plastic dielectric material comprises plastic coated ceramic material.

22. The variable electronic component of claim 1, wherein said dielectric material comprises a plurality of pieces.

23. The variable electronic component of claim 10, wherein said dielectric material comprises a plurality of pieces.

24. The variable electronic component of claim 17, wherein said dielectric material comprises a plurality of pieces.

* * * * *

UNITED STATES PATENT AND TRADEMARK OFFICE
CERTIFICATE OF CORRECTION

PATENT NO. : 5,229,911
DATED : July 20, 1993
INVENTOR(S) : David Ditlya

It is certified that error appears in the above-identified patent and that said Letters Patent is hereby corrected as shown below:

Column 1, line 61, "118" should read --108--.
Column 2, line 6, "Which" should read --which--.
Column 7, line 56, after "varying" insert --electrode--.

Signed and Sealed this

Twenty-ninth Day of March, 1994

Attest:

BRUCE LEHMAN

Attesting Officer

Commissioner of Patents and Trademarks